United States Patent [19]

Kuntz et al.

[11] Patent Number: 5,017,287
[45] Date of Patent: May 21, 1991

[54] DUAL CUP-SHAPED SUPPORTING FILTER BODY

[75] Inventors: Günther Kuntz, Munich; Johann Baarfüsser, Gauting, both of Fed. Rep. of Germany

[73] Assignee: Agfa Gevaert AG, Leverkusen, Fed. Rep. of Germany

[21] Appl. No.: 491,536

[22] Filed: Mar. 12, 1990

[30] Foreign Application Priority Data

Mar. 22, 1989 [DE] Fed. Rep. of Germany ....... 3909382

[51] Int. Cl.⁵ ............................................. B01D 27/08
[52] U.S. Cl. ................................. 210/433.1; 210/455; 210/497.01; 210/510.1
[58] Field of Search ................... 210/323.1, 323.2, 435, 210/438, 439, 446, 497.01, 433.1, 455, 497.1, 510.1

[56] References Cited

U.S. PATENT DOCUMENTS

| | | | |
|---|---|---|---|
| 3,698,559 | 10/1972 | Manjikian | 210/323.2 |
| 3,747,765 | 7/1973 | Nowack | 210/323.2 |
| 4,388,196 | 6/1983 | Lucia | 210/446 |
| 4,575,422 | 3/1986 | Zimmer | 210/446 |

FOREIGN PATENT DOCUMENTS

| | | |
|---|---|---|
| 2429415 | 1/1975 | European Pat. Off. . |
| 3117625 | 5/1982 | European Pat. Off. . |
| 0180768 | 5/1986 | European Pat. Off. . |

Primary Examiner—Robert A. Dawson
Assistant Examiner—Wanda L. Millard
Attorney, Agent, or Firm—Connolly & Hutz

[57] ABSTRACT

Figure 3:
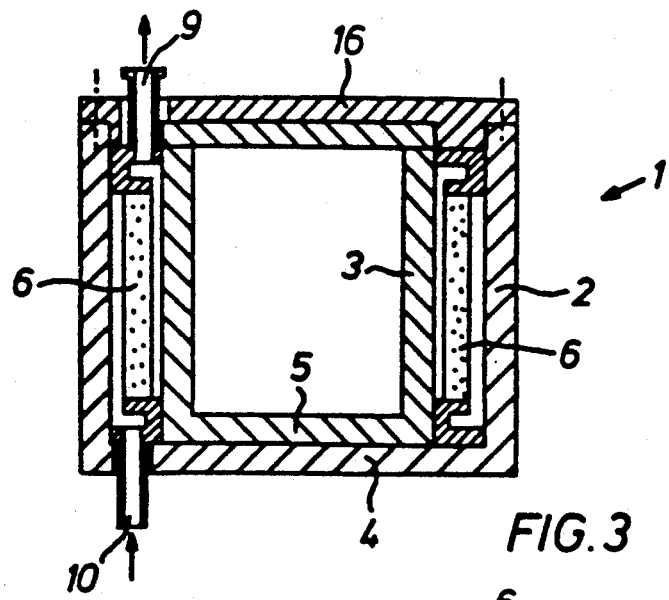

Filtering element for corrosive liquids to be filtered under pressure, which displays only minimal filtrate loss when the filter is changed, consisting of a pressure-resistant, cup-shaped outer supporting body (2) and a coaxial, also cup-shaped, pressure-resistant inner supporting body (3) having bottom surfaces (4, 5), wherein a filter cartridge (6) is disposed in the annular gap open towards the top between the supporting bodies (2, 3), said filter cartridge (6) consisting of an annular base portion (17) and cover portion (18) having inlet and outlet holes (9, 10) and, if desired, rigid or flexible wall portions (11, 12) between the base and cover portions and filtering material (15) between the wall portions, through which the liquid to be filtered is pressed radially from one hollow space to the other (FIG. 3).

4 Claims, 2 Drawing Sheets

DUAL CUP-SHAPED SUPPORTING FILTER BODY

The invention relates to a filtering element, especially for liquids to be filtered under pressure, comprising a cylindrical housing and a coaxial annular filter cartridge disposed therein, the liquid to be filtered flowing radially through this filter cartridge.

When using filtering elements and filter housings of the design known hitherto, high filtrate losses have to be taken into account owing to the type of construction and the fact that several filtering elements are used to form one combined filter with a larger filter area. When using toxic, ecologically harmful and expensive materials, this leads to difficulties with the disposal of used filtering elements and to high filtrate costs.

This is especially true in the case of the filtration of dispersions, e.g. magnetic dispersions, in which polymeric binding agents, inorganic pigments and additives are dispersed in an organic solvent. Dispersions of this kind are filtered under differential pressures of 2-10 bar by means of filters with pore sizes of 1-50 $\mu$m. In a known arrangement of this kind (FIGS. 1 and 2), there is an inlet hole (8) for the dispersion (100) at the bottom of the cup-shaped filtering element (7), a number of filter candles (19) being inserted into the cup, through which the dispersion is pressed. The inner faces of the filter candles are interconnected by means of ducts (112), so that the filtered dispersion can flow away through the connection (111).

Furthermore, DE-A 24 29 415 and EP 0 180 768 disclose liquid filters which are also suitable for the filtration of corrosive liquids by virtue of appropriate shaping and sealing methods. A disposable air filter is known from DE 31 17 625, comprising, in a cylindrical casing, an annular filter cartridge, through which the air to be filtered passes radially from the outside towards the inside.

The object of the invention is to provide a filtering element of the type specified hereinabove, which has a changeable filter cartridge and
- produces only minimal filtrate loss when the filter cartridge is changed,
- is designed in such a way that the filter cartridge withstands the operating pressure, without actually performing a pressure-resisting function, and
- ensures that the operating personnel have no contact with the liquid to be filtered when changing the filter.

Figure 1:
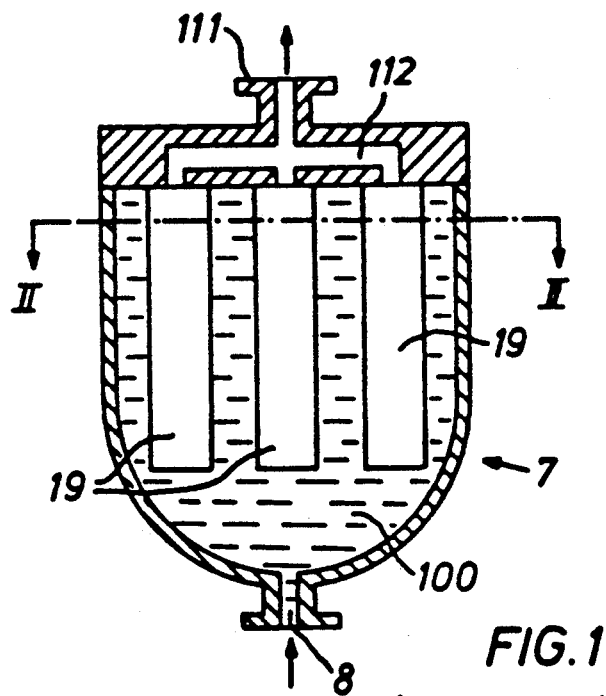
Figure 2:
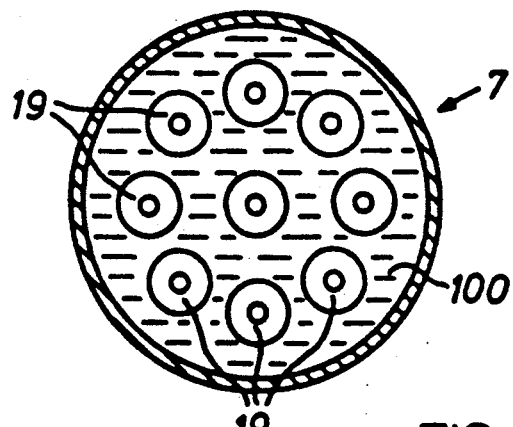
Figure 4:
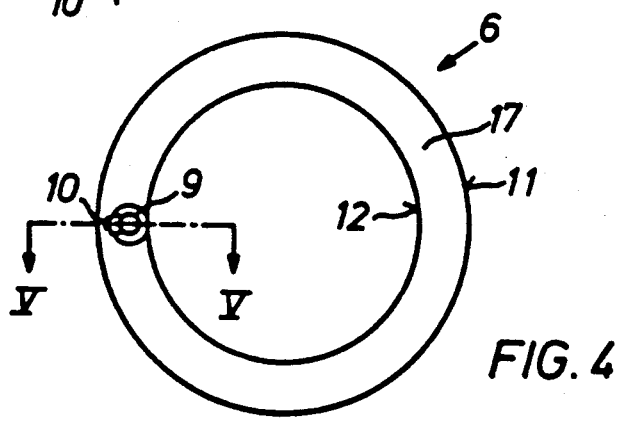
Figure 5:
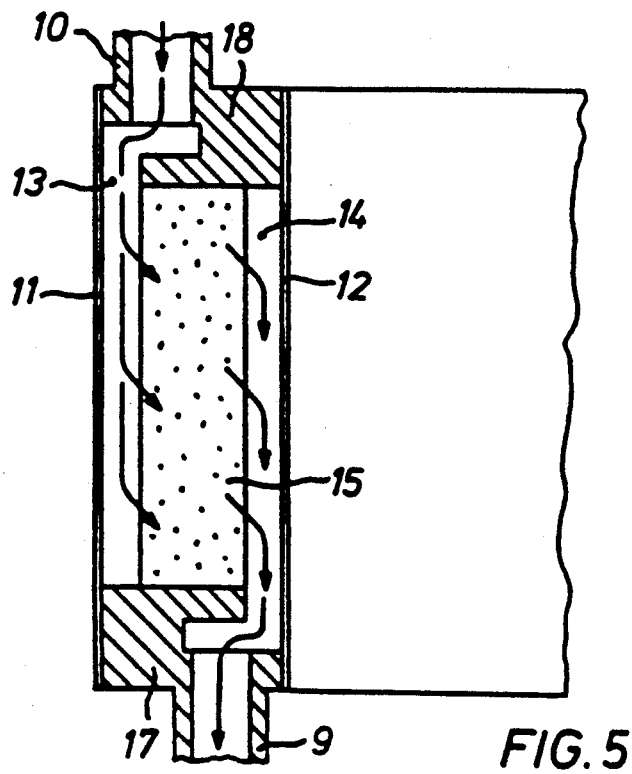

This problem is solved according to the invention by a filtering element having the features specified. A housing 1 consists of a pressure-resistant, cup-shaped outer supporting body 2 and a coaxial, also cup-shaped, pressure-resistant inner supporting body 3, the bottom surfaces 4, 5 of which can be firmly connected to one another, and wherein a filter cartridge 6 is disposed in the annular gap open towards the top between the supporting bodies 2, 3, said filter cartridge 6 consisting of an annular base portion 17 and cover portion 18 having inlet and outlet holes 9, 10, and wall portions 11, 12 between the base and cover portions, adjacent to the inner and outer wall portions respectively of the supporting bodies, and wherein in the hollow space 13, 14 between the wall portions there is a filtering material 15 through which the liquid to be filtered is pressed radially from one hollow space to the other. Further details of the invention will emerge from the subclaims, description and drawings. The invention will now be described in more detail with reference to the accompanying drawings, in which:

FIG. 1 shows a longitudinal section through a filtering element according to the prior art, FIG. 2 shows a cross-section through the filtering element according to FIG. 1, FIG. 3 shows a longitudinal section through a filtering element according to the invention, FIG. 4 shows a cross-section through a filter cartridge for the filtering element according to FIG. 3, and FIG. 5 shows a longitudinal section through a filter cartridge.

According to FIG. 3, the filtering element (1) according to the invention consists of a cup-shaped tubular cylindrical outer supporting body (2) having a bottom surface (4), which is pressure-resistant and consists of, e.g. stainless steel or rigid plastic. An inner supporting body (3), also cup-shaped, is arranged coaxially therewith. This inner supporting body (3) can also be tubular cylindrical and is also pressure-resistant.

The two bottom surfaces (4, 5) of the outer and inner supporting bodies respectively can be firmly connected to one another. A filter cartridge (6), the design of which can be seen in FIGS. 4 and 5, is inserted into the cylindrical ring-shaped gap between the two supporting bodies (2, 3). The filter cartridge (6) consists of a base portion (17) and a cover portion (18), both circular, and having an inlet and an outlet (9, 10) for the liquid to be filtered. One of these connections can be inserted through a corresponding recess in the bottom surface (4), and the other projects out of the annular gap open towards the top between the supporting bodies. Between the base and cover portions (17, 18) of the filter cartridge there are outer and inner wall portions (11, 12) consisting of rigid or flexible plastic. A filtering material (15), which can be a folded, rolled or sintered medium known from the prior art, e.g. consisting of polypropylene, polyethylene terephthalate, polyamide, cotton, fibre glass or steel, is disposed in the cylindrical hollow space formed by the wall portions. As the inlet is connected, e.g. with the inner hollow space, and the outlet is connected in a corresponding manner with the outer hollow space of the filtering element, the liquid to be filtered flows radially under pressure through the filtering material, the wall portions (11, 12) being supported on the corresponding inner faces of the supporting bodies (2, 3). A cover (16) is screwed on to the filtering element, and also prevents the filter cartridge pushing out.

When changing the filter, the entire filter cartridge (6) can be replaced without the operating personnel coming into contact with the liquid. By virtue of the particular geometric shape of the filtering element according to the invention, there is clearly only minimal filtrate loss.

In addition, the invention offers the advantage that the pressure-resistant housing does not need to be cleaned when changing the clogged filter cartridge, leading to a saving in cleaning costs and preventing contamination as a result of an inadequately cleaned filter housing.

Of course, modified and simplified embodiments of the filtering element according to the invention can also be envisaged. E.g. the wall portions (11, 12) of the filtering element can be dispensed with. In that case, the two supporting bodies must be cleaned when changing the filter, although all the other advantages described above remain.

We claim:

1. In a filtering element, for liquids to be filtered under pressure, comprising a cylindrical housing and a coaxial annular filter cartridge disposed therein, the liquid to be filtered flowing radially through this filter cartridge, the improvement which comprises the housing (1) consist of a pressure-resistant, cup-shaped outer supporting body (2) and a coaxial, also cup-shaped, pressure-resistant inner supporting body (3), the bottom surfaces (4, 5) of which can be firmly connected to one another, and wherein a single annular filter cartridge (6) is disposed in the annular gap open towards the top between the supporting bodies (2, 3), said filter cartridge (6) consisting of an annular base portion (17) and cover portion (18) having inlet and outlet holes (9, 10), and wall portions (11, 12) between the base 17 and cover 18 adjacent to the inner and outer wall portions respectively of the supporting bodies, and wherein between the wall portions 11 and 12 the single annular filter cartridge 6 has a filtering material (15) separating the hollow space between wall portions 11 and 12 into an outer chamber 13 and an inner chamber 14 and through which the liquid to be filtered is pressed radially from chamber 13 to chamber 14.

2. Filtering element according to claim 1, wherein the wall portions (11, 12) consist of rigid or flexible plastic.

3. Filtering element according to claim 1, wherein the filtering material (15) of the filter cartridge is a folded, rolled or sintered medium, consisting of polypropylene, polyethylene terephthalate, cotton, polyamide, fibre glass or steel.

4. Filtering element according to claim 2, wherein the filtering material (15) of the filter cartridge is a folded, rolled or sintered medium, consisting of polypropylene polyethylene terephthalate, cotton, polyamide, fibre glass or steel.

* * * * *